June 14, 1932.  H. J. HACH  1,863,011
PIPE VISE
Filed March 14, 1931  2 Sheets-Sheet 1
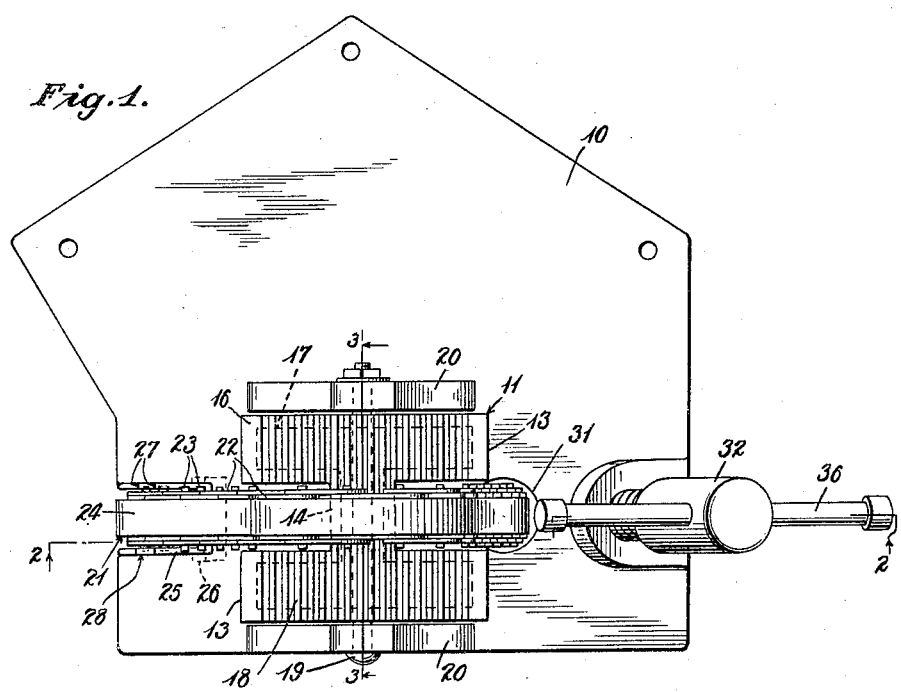
Fig.1.
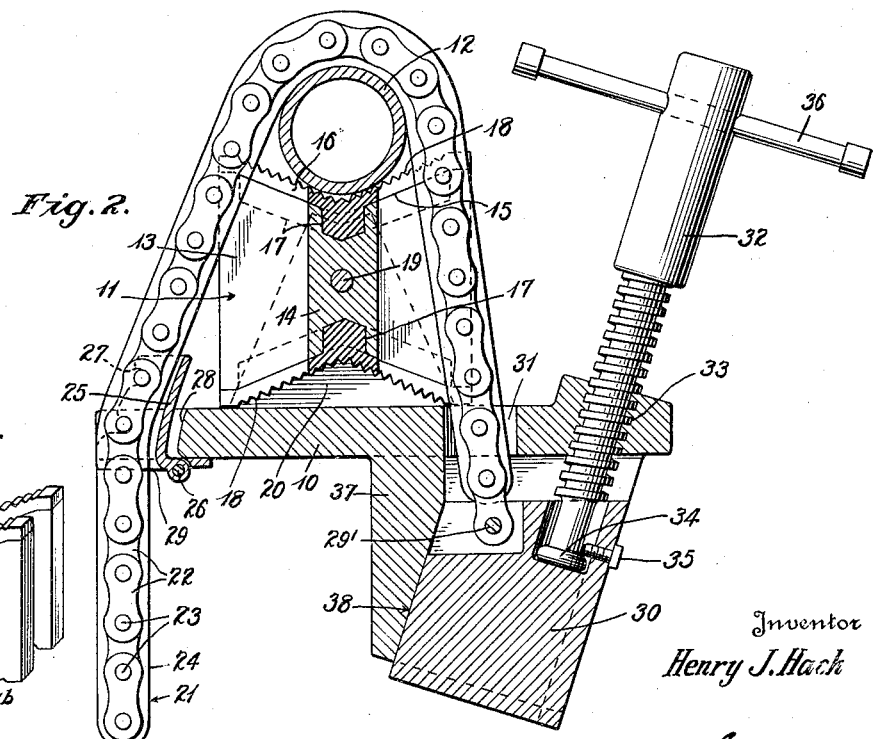
Fig.2.
Fig.8.
Inventor
Henry J. Hach
By Crowell Phelps
Attorneys June 14, 1932.  H. J. HACH  1,863,011
PIPE VISE
Filed March 14, 1931  2 Sheets-Sheet 2
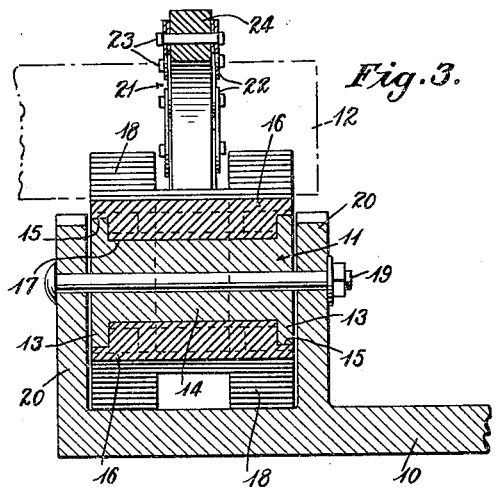
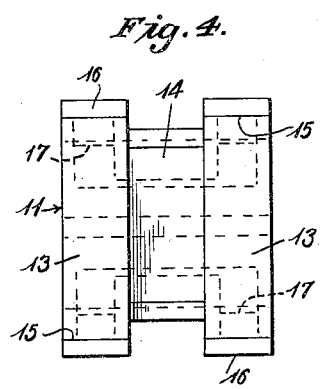
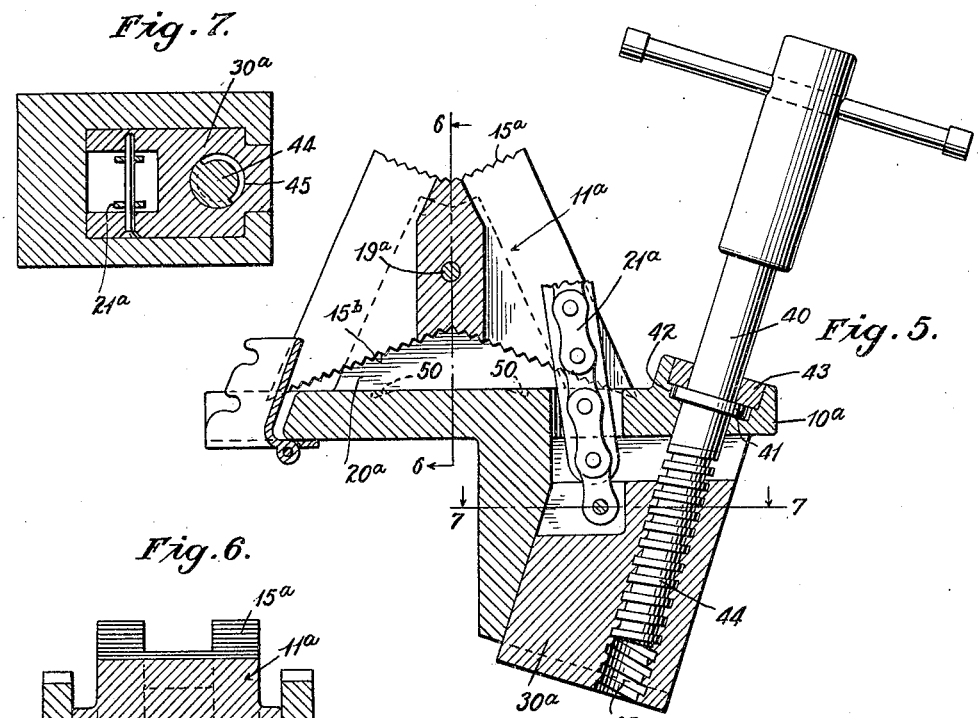
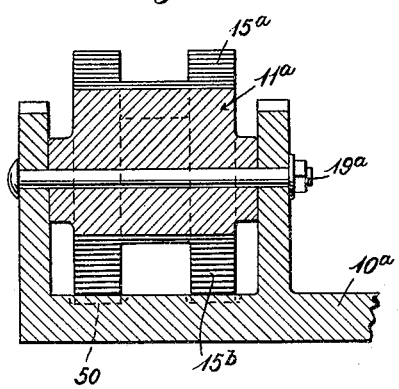
Inventor
Henry J. Hach
By Bennet Phelps
Attorneys Patented June 14, 1932

1,863,011

UNITED STATES PATENT OFFICE

HENRY J. HACH, OF LOUISVILLE, KENTUCKY

PIPE VISE

Application filed March 14, 1931. Serial No. 522,707.

This invention relates to a pipe vise. An important object is to provide a novel construction utilizing a chain or other flexible element wherein the tightening pull on the chain is in a substantially direct line and binding between the tightening screw means, its mounting and the chain is avoided. In addition it is an aim to provide such a construction that the screw may be operated from above the base of the vise in order to afford maximum space for operation and avoid the danger of marring one's hands by contact with adjacent structure.

It is further an object to provide a sliding block or equivalent which moves in an inclined plane and has connection with the operating screw and with a chain so that the anchor point of the chain will be moved automatically toward and away from the vertical axis line passing through the pipe, according to the size of the latter.

Another object is to provide a novel form of pipe supporting block which is reversible to present different surfaces according to the size of the pipe desired or according to wear.

It is also aimed to provide a novel movably mounted anchoring means for the relative fixing of the chain and also provide a pipe gripping surface of rubber, so that any of the standard sizes of pipe may be gripped without mutilation or marring, especially in the case of thin nickel-plated pipe.

The more specific objects and advantages will become apparent from a consideration of the description following, taken in connection with the accompanying drawings illustrating an operative embodiment, and wherein Fig. 1 is a plan view of the improved vise.

Fig. 2 is a vertical sectional view taken on the line 2, 2 of Fig. 1.

Fig. 3 is a sectional detail taken on the line 3, 3 of Fig. 1.

Fig. 4 is an end elevation of the aforesaid block.

Fig. 5 is a vertical sectional view substantially like Fig. 2, through a modified form.

Fig. 6 is a sectional view taken on the line 6, 6 of Fig. 5.

Fig. 7 is a sectional view taken on the line 7, 7 of Fig. 5, and

Fig. 8 is a perspective view of a modified form of jaw block.

Referring specifically to the drawings, 10 designates a base, preferably of suitable metal of any desired size or shape, adapted to be supported on a work bench, by legs, against a wall or in any other manner well known in the art.

Disposed on the base 10 is a block 11 which is adapted to support the pipe or other object, as at 12. The block 11 is generally of H shape in horizontal section, thus having side portions 13 which are connected by a web 14. The upper and lower faces of the block are cut away so as to present V-shaped jaws, at 15, adapted for direct contact with the pipe 12. The web 14 affords a bearing or contact surface throughout the length of the block, which is especially desirable in the case of pipe of the smaller sizes. The jaw surfaces 15 are lined or provided with facing strips 16 of rubber, of any desired degree of elasticity, which rubber is cemented or vulcanized or otherwise secured in grooves 17 provided in the walls 13 and web 14 of the block. Preferably but not necessarily, the surfaces of the rubber strips 16 are serrated or roughened at 18 where they directly engage the pipe.

Said block 11 is reversible to present either jaw uppermost, as when one becomes worn after continued use. Also, the jaws may be of different sizes so that the size desired may be arranged uppermost.

The block 11 is held in place by means of a removable bolt 19 which is passed through the web 14 and through ears 20, rising from the base.

The flexible element which grips the pipe 12 in co-action with the block, is shown at 21, and may be an ordinary chain or the like, but preferably is of the type disclosed in my pending application filed of even date herewith for an improved gripping chain structure, Serial Number 522,705, since it has metallic links 22 flexibly connected by metallic pins 23, and gripping surface 24, of rubber, projecting outwardly beyond the surfaces of the links, so that the pipe 12 will be engaged solely by the rubber rather than the metallic parts of the chain.

The free end of the chain is adapted to be releasably secured to a movable anchoring member 25 which is pivotally connected, as at 26, to the base 10. The anchoring member 25 is U-shaped in horizontal section, and the chain passes through the channel thereof so that the adjacent outwardly projecting ends of the pins 23 may selectively engage notches 27 provided in the side walls of the anchor member. Such anchor member 25 is primarily located in a notch or cutaway portion 28 in the base and has laterally extending flanges 29 in most instances engageable with the under surface of the base to avoid undue strain on the anchor member.

The other end of the chain 21 is connected by a removable pin 29' to a slidable block 30, such chain passing through an opening 31 in the base 10.

The block 30 is adapted to slide on an upward and outwardly inclined axis, and it is moved through the actuation of a screw 32, threaded at 33 in the base, and having its lower end 34 swiveled in the block and held in place through overlapping of a set screw 35 with such lower end. Screw 32 may have a handle rod 36, to enable sufficient leverage to be applied for operation.

It will be realized that the screw is operable from a position above the base, giving the utmost freedom to the operator so that his hands will not contact with the adjacent structure and be injured, as well as enabling rotation of the handle 36 in the path of a complete circle, and thus, rapidly and expeditiously.

The block 30 moves in a guide housing 37 depending from the base 10, which is channel shaped in horizontal section, the same having a wall or surface 38 parallel to the axis of the screw 32 which is directly engaged by a correspondingly disposed wall of the block 30.

Particular attention is called to the fact that the mounting of the screw and chain, by means of the block 30, avoids binding and undue frictional or side engagement of the screw threads of the screw 32 with its mounting and of the screw with the chain and block. This construction also causes the location of the pin 29' with respect to the plane passing vertically through the axis of the pipe, to vary according to the size of pipe which is held, that is the smaller the diameter of pipe, the closer the pin 29' will be to said vertical line, and the greater the diameter the farther the pin will be to such line, thus enabling substantially a direct pull to be had on the adjacent end of the chain irrespective of the size of pipe which is gripped.

The movable anchor 25, also enables the portion of the chain connected thereto, to be moved automatically farther from the said line, when a relatively large pipe is held by the chain and block, thus enabling a more direct pull on the chain to be had at that side thereof.

As a result of the construction described, all metallic contact of the jaw and chain with the pipe is avoided, which is especially advisable in the case of pipe which is plated with nickel or ornamentally finished in any other way since the surface will be engaged only by the rubber jaws and by the rubber of the chain, frictionally holding the pipe and not requiring such an excessive pressure as will mar its surface or indent the pipe.

Various changes may be resorted to provided they fall within the spirit and scope of the invention, and for example those suggested in the modifications of Figs. 5 to 7. In this modified form, a non-rising operating screw 40 is provided in lieu of the rising screw 32. Screw 40 has a coil or flange 41 thereon which is held in a recess 42 of the base, here designated 10$^a$, being held in such recess by a closure ring 43 secured in place in any desired manner. The screw thread 44 of such screw engages screw threads 45 in a block 30$^a$ equivalent to that at 30.

This modified form of vise is primarily adapted for use in connection with ordinary pipe, and to this end, the chain shown at 21$^a$ may be ordinary metallic chain although it may be like 21 if desired. A different form of jaw block is used at 11$^a$ in lieu of that at 11, the same however being reversible in order to present either of the V-shaped jaws 15$^a$ or 15$^b$, uppermost, according to the size of the pipe to be held, such jaws differing in size as clearly shown in Fig. 5. The ends of the jaws 15$^a$ and 15$^b$ may be positioned in notches or recesses 50 in the upper surface of the base 10$^a$. The block 11$^a$ in this form is held in operative position by a bolt 19$^a$, like in the previous construction.

Figure 8 illustrates a modified form of jaw block 11$^b$ which may be substituted for the previously described jaw block 11, and it differs from the latter in that a rubber facing strip 51, of the same construction as that at 16, is provided on one jaw surface only. The other jaw surface of said block 11$^b$ is adapted to directly engage the pipe or other work and is preferably serrated or roughened as at 52.

I claim as my invention:

1. In a vise, a base, a jaw therefor, a flexible element passing over said jaw, means operable to tighten the flexible element, an anchor for the normally free end of the flexible element, means of separable engagement between the anchor and the flexible element, and means movably connecting the anchor to the base, said anchor having means thereon adapted to abut the base.

2. In a vise, a base, a jaw therefor, a chain passing over said jaw, means operable to tighten the chain, an anchor for the chain, and means movably connecting the anchor to the base, said anchor being of channel form and having a notch in one of its walls engageable by the flexible element, and said anchor having a flange adapted to abut the under surface of the base.

3. A jaw for a vise or the like comprising a substantially H-shaped body of V-form at one end, the body at said end having a groove substantially following its contour, and a H-shaped element substantially of rubber interfitted in said groove and adapted for direct engagement with a pipe or the like.

4. In a vise, a base, a jaw therefor, a flexible element passing over said jaw, means operable to tighten the flexible element, an anchor for the flexible element, means movably connecting the anchor to the base, interengaging means between said flexible element and anchor, and said anchor having a projection adapted to abut the under surface of the base.

5. In a vise, a base, a jaw therefor, a flexible element passing over said jaw, means operable to tighten the flexible element, said flexible element having a gripping surface substantially of rubber, an anchor for the normally free end of the flexible element, means of separable engagement between the anchor and the flexible element, and means connecting the anchor to the base, said anchor having means thereon adapted to abut the base.

6. In a vise, a base, a jaw thereon having a gripping surface substantially of rubber, a flexible element passing over said jaw, means operable to tighten the flexible element, said flexible element having a gripping surface substantially of rubber, an anchor for the normally free end of the flexible element, means of separable engagement between the anchor and the flexible element, and means connecting the anchor to the base, said anchor having means thereon adapted to abut the base.

HENRY J. HACH.